United States Patent
Ives et al.

(10) Patent No.: US 7,106,169 B2
(45) Date of Patent: *Sep. 12, 2006

(54) METHODS AND APPARATUS FOR VERIFYING THE INSTALLATION OF COMPONENTS IN A SYSTEM

(75) Inventors: Thomas W. Ives, Boise, ID (US); Robert A. Rust, Boise, ID (US); Barry J. Oldfield, Boise, ID (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/607,315

(22) Filed: Jun. 26, 2003

(65) Prior Publication Data

US 2004/0075533 A1    Apr. 22, 2004

Related U.S. Application Data

(63) Continuation of application No. 09/678,601, filed on Sep. 26, 2000, now Pat. No. 6,661,334.

(51) Int. Cl.
*G08B 29/00* (2006.01)
*G08C 19/00* (2006.01)

(52) U.S. Cl. ............... 340/5.64; 340/5.53; 340/5.61; 340/825.24; 340/825.69; 340/825.72; 340/5.74; 710/200; 710/8; 710/36; 710/72

(58) Field of Classification Search ............... 340/5.64, 340/5.6, 5.74, 5.53, 5.61, 825.24, 825.69, 340/825.72; 710/200, 8, 36, 72; 361/193
See application file for complete search history.

(56) References Cited

U.S. PATENT DOCUMENTS

| | | | | |
|---|---|---|---|---|
| 4,752,679 | A | * | 6/1988 | Wehrmacher ............... 235/382 |
| 5,557,544 | A | * | 9/1996 | Simon et al. .................. 702/77 |
| 6,331,812 | B1 | * | 12/2001 | Dawalibi ..................... 340/5.2 |

* cited by examiner

*Primary Examiner*—Brian Zimmerman
*Assistant Examiner*—Vernal Brown
(74) *Attorney, Agent, or Firm*—John S. Reid (57) ABSTRACT

A verification system for an interchangeable component configured to be mated with a receiving system. The system includes a key device supported by the interchangeable component. The key device includes a transmitter configured to transmit a signal comprising component identification characteristics. The system further includes a lock system having a signal receiver and a verification component. The signal receiver is configured to receive the signal from the key device transmitter and pass the signal to the verification component. The verification component is configured to use the signal to determine whether or not the component should be admitted to the receiving system, and to generate an authorization signal if the component should be admitted.

14 Claims, 9 Drawing Sheets

METHODS AND APPARATUS FOR VERIFYING THE INSTALLATION OF COMPONENTS IN A SYSTEM

CROSS REFERENCE TO RELATED APPLICATIONS

This application is a continuation of U.S. patent application Ser. No. 09/678,601, filed Sep. 26, 2000 now U.S. Pat. No. 6,661,334.

FIELD OF THE INVENTION

This invention pertains to removable components, particularly electronic and electrical components, which are supported within a system, and methods and apparatus to reduce the likelihood that a component is incorrectly inserted into the system.

BACKGROUND OF THE INVENTION

Figure 1:
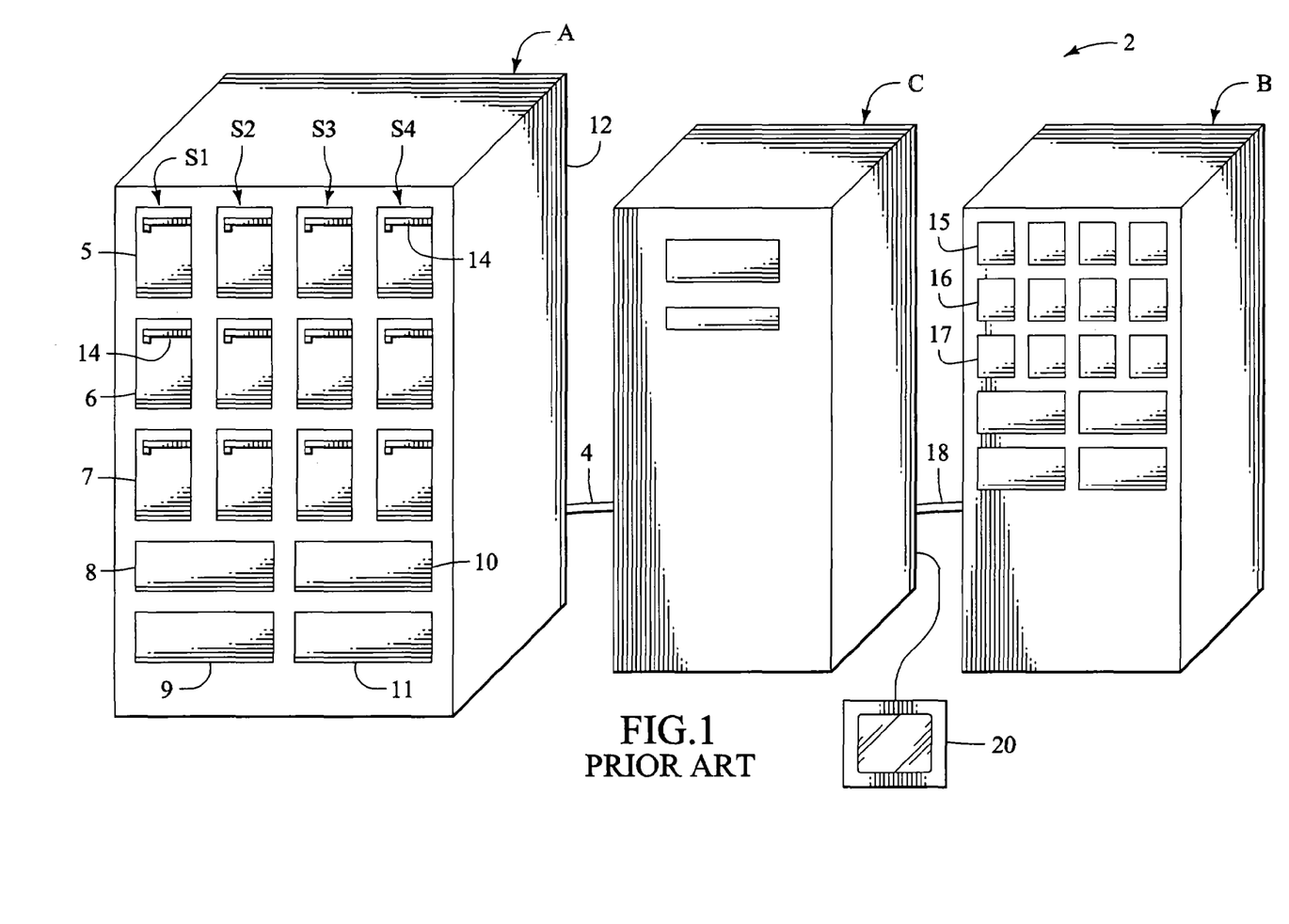
FIG. 1 is an oblique diagram of a data array system of the prior art.

Many systems include a plurality of modules configured to perform designated functions within the system. The modules are supported in one or more chassis, and the modules are interconnected in the system, typically through a central controller. While the modules are frequently electronic modules, they can also include hydraulic and pneumatic modules, as well as optical modules in a fiber optic system. One example of a system utilizing electronic modules is a mass computer memory storage array. FIG. 1 depicts such a system 2, which includes a first memory array "A", a second memory array "B", and a central controller "C". The system 2 depicted in FIG. 1 is a simplified diagram of a mass computer memory storage system, and is used for illustrative purposes only. The system 2 can, for example, be a computer server used to store Internet content, in which case the controller "C" is configured to send and receive large amounts of data to and from a telecommunications communications network. Another example of a use of the system 2 of FIG. 1 is to store large quantities of data used for analysis purposes, such as in imaging complex structures. Array "A" of the system 2 is connected to the controller "C" by cable 4, and array "B" is connected to the controller "C" by cable 18. Each array comprises a chassis (not shown) which supports the modules within the array. In one variation on the system depicted in FIG. 1, the system can comprises a single array "A", and the control functions performed by the central controller can be incorporated within the cabinet 12 of array "A". The system 2 can be further expanded by adding more arrays in communication with the central controller "C".

The array "A" of FIG. 1 comprises a plurality of memory modules 5, 6 and 7, as well as auxiliary modules 8, 9, 10 and 11, which can comprise such things as power supplies, cooling fans, and local control modules. Array "B" of FIG. 1 can comprise similar modules, such as memory modules 15, 16 and 17. The controller "C" is configured to direct data to, and retrieve data from, any of the modules within either array. Consequently, the controller "C" contains a computer readable "map" of the overall memory array system, which identifies to the central controller the array and the module within the array where particular data is stored. This "map" allows the central controller to access stored data, to know where data can be stored without overwriting in-use sectors, and to "remember" where it has stored data. The specific methods for configuring such large memory array systems for the storage and retrieval of data are generally well known in the art, and will not be discussed further. However, some general features leading to shortcomings with the current state of the art will now be discussed.

The various modules in each array are removably supported within slots in the array. Removability allows a module to be removed for servicing or upgrades, and allows an operator to reconfigure the system by moving modules from one location to another. However, such removability introduces the opportunity for human error. For example, an operator can accidentally remove the wrong module from an array, can insert a module into the wrong slot within an array, or can insert a module into the wrong array. Since some systems have thousands of modules placed in hundreds of arrays, the opportunity for inserting the wrong module into the wrong slot is not unlikely. In many systems a particular slot in an array is dedicated to a particular module, which reduces, but does not eliminate, the chance for human error. However, in more advanced systems the central controller can be configured to automatically select a slot within an array, or within any array in the system, to perform a particular function, or to receive a particular module. This variability allows the system greater flexibility and operating efficiently, but greatly increases the opportunity for operator error.

By way of example, typically memory modules are actively backed-up using a dedicated module to back up two primary modules. For example, with respect to FIG. 1, a "data stripe" S1 can consist of two primary memory modules 5 and 6, and a back-up module 7. A single back-up module 7, when used in conjunction with a back-up algorithm and a computer processor, can be used to back-up the contents of two primary modules 5 and 6. For example, the back-up module 7 can store the binary sum of the modules 5 and 6. In this way, if memory is lost from module 5, it can be restored merely by processing the contents of modules 6 and 7 using the back-up algorithm to calculate the lost data in module 5. If one of the three modules is determined to be defective by a diagnostic program, a fourth available module can be put into service in the capacity of a back-up or a primary module. After the defective module has been repaired, it can be replaced into the slot from which it was removed or into another slot configured to receive the module, and the fourth module put into other service. However, if an operator were to accidentally reinstall the repaired module into the wrong slot, then any data which is lost in the first or second module cannot be restored. For example, let us assume that module 7 in data stripe S1 is defective, and module 20 in data stripe S4 is defective. Both modules 7 and 20 are then removed for service and repaired. If module 7 is subsequently and accidentally installed in an open slot not configured for back-up service of modules 5 and 6, then loss of data can occur due to the system configuration.

The system can be further complicated by advances in memory arrays, for example where the back-up module is selected by a controller, rather than being the third module in a memory stripe. In this instance, the back-up module can be one of any of the modules in the array in the system. Additionally, in some configurations the memory stripe consists of five or more memory modules, and so it is not always obvious that the third module down is the back-up module.

In addition to the risk of accidentally installing a module in the incorrect slot for that module, there is a risk that a defective module can accidentally be re-installed into the system prior to having been serviced, or having been improperly serviced. In this instance, using the defective module can lead to loss of data or other problems.

What is needed then is a way to decrease the risk that a module in a system will be installed into the wrong position, or that the module will be installed when it should not be.

SUMMARY OF THE INVENTION

The invention includes methods and apparatus for verifying that a component to be installed in a receiving system is acceptable to the system, and to the location in the system in which the component is being installed. One embodiment of the invention is an electronic key device for use in a component intended to be received within a system. The system has an electronic lock device configured to respond to the electronic key device. The electronic key device comprises a readable memory containing an identification code and a signal transmitter configured to access the identification code from the readable memory. The signal transmitter is further configured to transmit the identification code to the receiving system as an identification signal. The electronic key device can further comprise a power source and an information processing device. The readable memory can also contain a history of the component, which can be used as part of the identification signal. The readable memory can further comprise user input data useful to the receiving system in determining whether or not to receive the component.

A second embodiment of the invention is a verification system for an interchangeable component, wherein the component is configured to be mated with a receiving system. The verification system includes a key device supported by the interchangeable component. The key device is configured to transmit a signal comprising component identification characteristics. The verification system also includes a lock system having a signal receiver, a verification component, and a component lock-out device. The signal receiver is configured to receive the signal from the key device and pass the signal to the verification component. The verification component is configured to use the signal to determine whether or not the component should be admitted to the receiving system, and to generate an authorization signal if the component should be admitted. The component lock-out device is configured to receive the authorization signal from the verification component and to the provide the component access to the receiving system in response to receipt of the authorization signal.

A method in accordance with the present invention includes a method for verifying whether or not a component should be received into a receiving system. In the method, the component is at least partially inserted into the receiving system. An identification signal is then generated from the component which identifies the component to the receiving system. The identification signal is analyzed to determine whether or not to admit the component to the receiving system. If the analysis determines that the component should be admitted to the receiving system, an authorization signal is generated. If an authorization signal is generated, the authorization signal is used to allow the component to be admitted to the system. The method can also provide that if the analysis determines that the component should not be admitted to the system, a signal to a user is generated indicating that the component is not admitted to the receiving system. The method can further include admitting the component to the receiving system, and performing a diagnostic analysis of the component prior to placing the component in service in the system.

An example of a component which can embody the verification methods and apparatus of the present invention is a module in a computer system. The computer system can be, for example, a mass memory storage system.

DETAILED DESCRIPTION OF THE INVENTION

The invention disclosed and described herein includes methods and apparatus for verifying that a component to be installed in a receiving system is acceptable to the system, and to the location in the system in which the component is being installed. An apparatus in accordance with the present invention is an electronic key device for use in a component intended to be received within an electronic system which has an electronic lock device. The electronic lock device is configured to respond to the electronic key device.

A second apparatus in accordance with the present invention provides for a verification system for an interchangeable component, wherein the component is configured to be mated with a receiving system. The verification system includes a key device supported by the interchangeable component. The key device is configured to transmit a signal comprising component identification characteristics. The verification system also includes a lock system having a signal receiver, a verification component, and a component lock-out device. The signal receiver, lock-out device and verification component act in concert to admit or deny the component access to the receiving system, depending on whether or not the component is determined by the lock system to be acceptable to the receiving system for the intended use and location within the receiving system.

The invention also includes a method for verifying whether or not a component should be received into a receiving system.

The invention will now be described by way of example, with respect to the following discussion and the accompanying drawings. It is understood that the following detailed description does not include all possible embodiments of the invention, but should be considered as providing one skilled in the art with a sufficient understanding of the invention such that any embodiment within the scope of the appended claims can be made and used.

In the following examples we will show how the invention can be used with a module which is intended to be received within a computer array. However, the module should be understood as being one example of a component which is intended to be received within a system. Likewise, the computer array is but one example of a receiving system intended to receive a component, such as a module. The system can be an electronic system, such as a computer system, or an optical fiber system, a hydraulic system, a pneumatic system, or any system in which signals are moved between the components within the system and a controller within the system. Another example of a component in a system which can use the verification system of the present invention is a cable connector in a computer system, in order to prevent the wrong cable from being connected to a connector.

We will begin by discussing the physical arrangement of the various components in a verification system in accordance with the present invention, including variations. We will then discuss the operational aspects of the verification system.

In general, apparatus in accordance with the present invention include a key device for signaling the identification of the component to the receiving system, and a lock device for determining whether the component should be admitted to the receiving system. Each of these devices include various sub-components. It is understood that the sub-components do not need to be contained within a single enclosure, and that it is possible to arrange the sub-components in any manner which still accomplishes the objectives of the invention, resume Turning now to FIG. 2, a side elevation sectional view of a part of a computer array 100 is shown. The computer array can be similar to the array "A" depicted in FIG. 1. The array 100 includes a chassis 120 which is configured to receive at least one module, and preferably a plurality of modules. A single module 110 is depicted as being partially inserted into a slot within the chassis. The module is supported by shelf 126, which is in turn supported by bracket 128, which is part of the chassis 120. The chassis also supports an electrical board or "plane" 122. The plane is used to communicate electrical power to the modules, as well as to communicate data to and from the modules. The plane can be in communication with a controller included in the array 100, as well as with a central controller such as controller "C" of FIG. 1. A plane connector 124 is mounted on the plane 122. The plane connector is configured to mate with a module connector 116, thus allowing the plane and module to be in electronic communication. The module includes a circuit board 114 which is in communication with the module connector. The module can also include other internal components (not shown), such as a disk drive.

Figure 2:
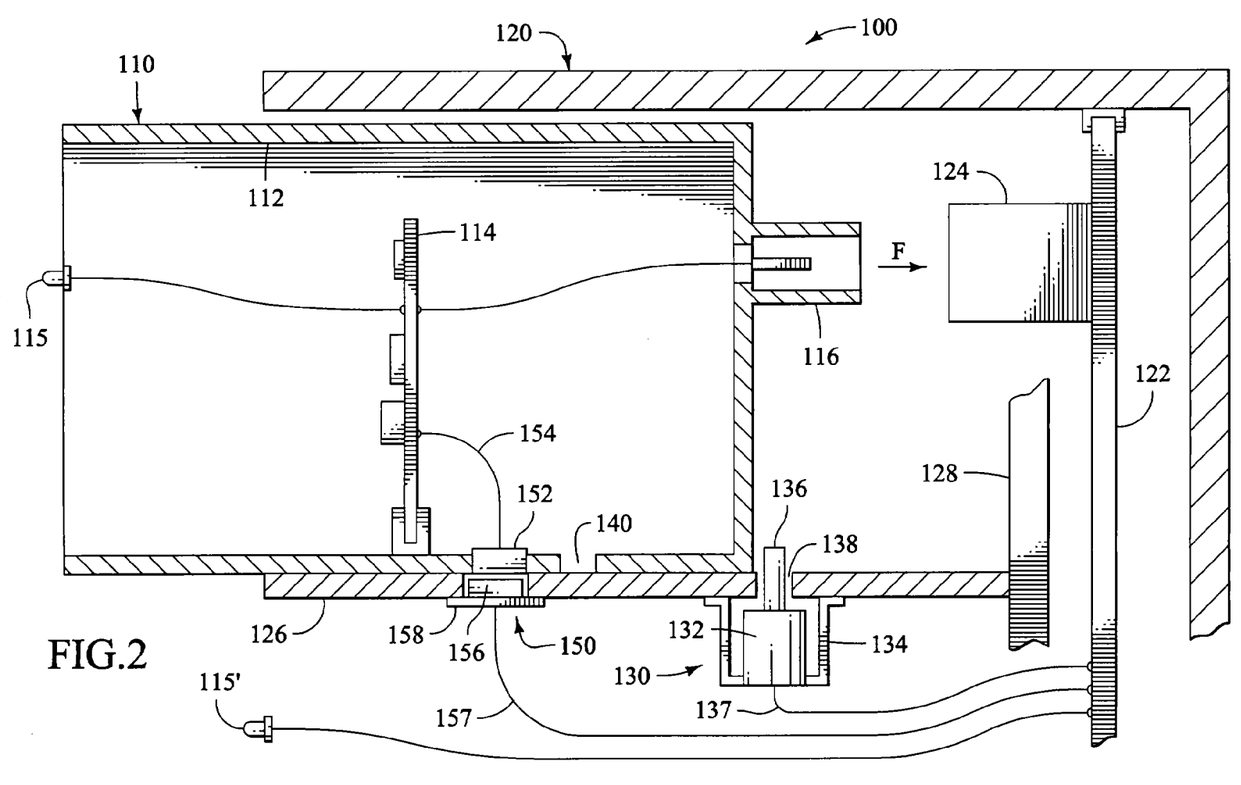
FIG. 2 is a side elevation sectional view of a module partially inserted into an array which employ a verification system in accordance with the present invention.

The module 110 and array 100 include a component verification system 150 in accordance with one embodiment of the present invention. The verification system includes a key device and a lock device. The key device comprises an electronic key 152, and the lock device comprises an electronic lock signal unit 156. The lock device can also include a mechanical lock-out apparatus 130. The mechanical lock-out apparatus 130 can be eliminated in one variation on the embodiment and replaced with an electronic lock-out apparatus, as will be discussed further below, . As shown, the electronic key 152 is supported by the module 110 and is mounted in an opening in the bottom of the module enclosure 112. The lock signal unit 156 is mounted to a bracket 158, which is supported by shelf 126. The electronic key and the lock signal unit are positioned such that when the module 110 is initially inserted into the chassis 120, they are in close proximity.

Figure 4:
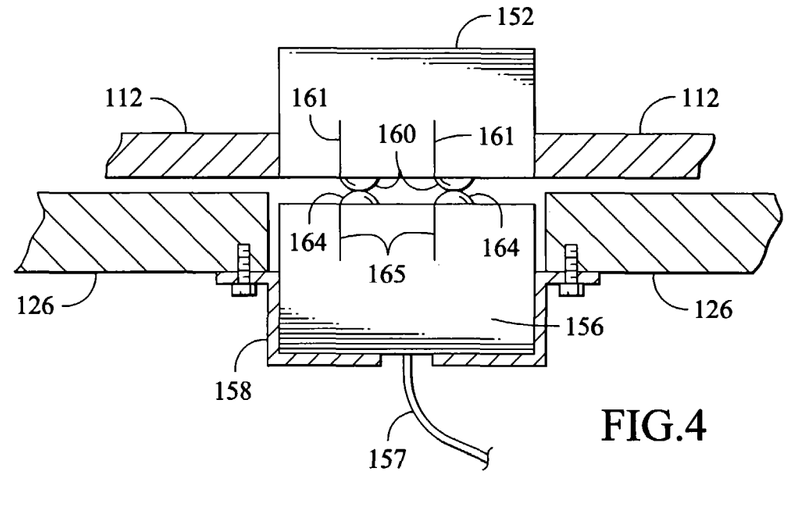
FIG. 4 is a side elevation sectional view of one embodiment of a module lock-and key communication arrangement in accordance with the present invention.
Figure 5:
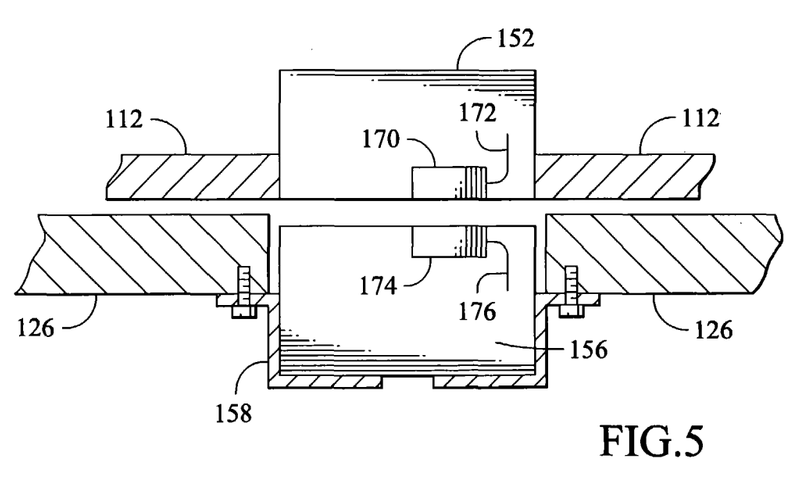
FIG. 5 is a side elevation sectional view of a second embodiment of a module lock-and key communication arrangement in accordance with the present invention.

The electronic key 152 and the lock signal unit 156 are configured such that they can be in signal communication with one another when the module 110 is inserted into the chassis 120 as depicted in FIG. 2. Signal communication can be accomplished in a variety of ways. Turning briefly to FIGS. 4 and 5, two configurations for allowing the electronic key 152 and the lock signal unit 156 to be in signal communication with one another are depicted. In FIG. 4, the electronic key 152 comprises metallic contacts 161 which are connected to a cable 160, which is in turn connected to other components (not shown) within the electronic key. The metallic contacts protrude slightly below the bottom surface of the electronic key, and are biased slightly away from the lower surface. In a similar manner, the lock signal unit 156 comprises metallic contacts 165 which are connected to a cable 164, which is in turn connected to other components (not shown) within the lock signal unit. The metallic contacts protrude slightly above the upper surface of the lock signal unit, and are biased slightly away from the upper surface. When the electronic key 152 and the lock signal unit 156 are brought into proximity, the metallic contacts 161 and 165 contact one another, providing an electrical circuit through which electrical signals and electrical power can flow.

In FIG. 5, a second embodiment of how signal communication between the electronic key 152 and the lock signal unit 156 can be accomplished is shown. The electronic key 152 of FIG. 5 comprises a transmitter 170, which is connected via cable 172 to other internal components (not shown) within the electronic key. The transmitter can transmit signals using a low range carrier signal, such as an infrared signal or a radio frequency signal. The lock signal unit 156 comprises a receiver 174, which is connected via cable 176 to other internal components (not shown) within the lock signal unit. The receiver 174 is configured to receive signals from the key transmitter 170. In this manner, electronic signals can be passed from the electronic key 152 to the lock signal unit 156.

Returning to FIG. 2, the electronic key 152 is depicted as being in electrical communication with the circuit board 114 within the module 110. Although the electronic key does not need to be configured in this manner, certain advantages can be obtained from this arrangement, as will be discussed further below.

The example depicted in FIG. 2 includes a mechanical lock-out device 130. In this arrangement, the lock-out device prevents the module connector 116 from being connecting to the plane connector 124 until the module has been verified as acceptable, as will be more fully described below. However, in a variation on the embodiment shown in FIG. 2, the verification system does not include a mechanical lock-out device 130, and the module can be fully inserted into the slot in the chassis 120 and physically connected to the plane 122 prior to being verified. However, as will be described in more detail below, the verification system can be configured with an electronic lock-out device such that the module is not placed in service until after it has been verified, even though it can be physically connected to the system 100. In this latter variation, the module can be provided with limited access to the system. For example, the system controller can be configured to provide power to the module 110, but not to allow the module signal access to the system other than for verification purposes.

The module 110 in FIG. 2 is also depicted as including a light emitting diode (LED) 115, which is mounted on the front of the module 110 and is connected to the circuit board 114. The LED can be used to signal to a user that the module is either acceptable to the system 100, or not acceptable to the system, as will be more fully described below. An alternate location for the indicator light is shown at position 115', wherein the LED is mounted on the chassis 120 and is connected to the plane 122 of the array. The LED can signal to the user that the module is acceptable to the system by illuminating. Then user can fully insert the module from the position depicted in FIG. 2 to the position depicted in FIG. 3. However, when the module is in the position depicted in FIG. 2, the LED will not be able to receive power via the module connector 116. In this instance, alternative sources of power for the LED can be employed. For example, a battery internal to the module 110 can be used. Alternately, when the connection arrangement depicted in FIG. 4 is used to connect the electronic key 152 and the lock signal unit 156, power for the LED 115 can be obtained via the plane 122.

In a similar manner, the electronic key typically is configured to require power to perform its functions. Power can be obtained from a battery internal to either the module 110 or the electronic key 152, or power can be obtained via the plane 122 when a connection such as that depicted in FIG. 4 is used. In an alternate embodiment, when the verification system does not include the mechanical lock-out device 130 but instead uses an electronic lock-out device, the module can be fully inserted into the slot and connected to the plane connector 124, and the electronic key can receive power via connector 116. In yet another embodiment, the electronic key can receive power from an inductive coil located within the chassis, or it can receive power via a radio frequency signal or the like broadcast from a transmitter located within the chassis.

Figure 3:
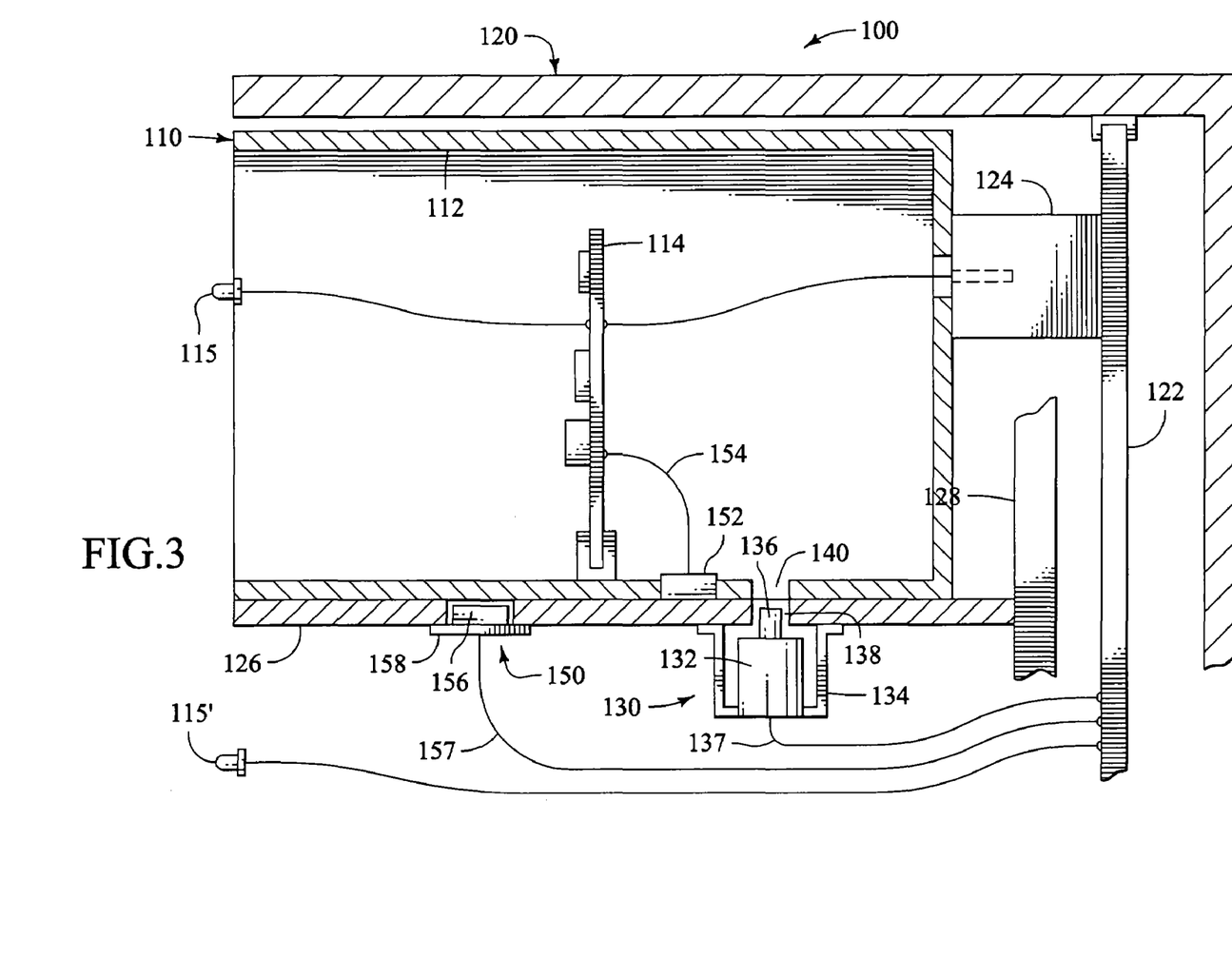
FIG. 3 is a side elevation sectional view of the module depicted in FIG. 2, but with the module fully inserted into the array.

A mechanical lock-out device 130, which can be used in the verification system, can be configured as depicted in FIGS. 2 and 3. Other lock-out devices can also be used to equal effect. The lock-out device 130 comprises a moveable securing pin 136 which can protrude through a hole 138 in the shelf 126, effectively blocking movement of the module from the position depicted in FIG. 2 to the position depicted in FIG. 3. The securing pin can be activated by an actuator, such as solenoid 132, which is supported by bracket 134, which is in turn attached to the shelf 126. The solenoid can be powered via the plane 122. The lock-out device can be configured to maintain the securing pin in the position shown in FIG. 2 until the verification system has verified that the module should be admitted to the system 100. At that time a controller can activate the solenoid 132 and retract the securing pin 136 to the position shown in FIG. 3, so that the module can be fully inserted into the slot and the connectors 16 and 124 mated.

The module 110 can be further provided with a securing hole 140 so that once the module is accepted to the system, the actuator 132 can be activated to move the securing pin 136 into the hole 140, thus securing the module in the system 100.

It is understood that the electronic lock-and-key device depicted in FIG. 2 is but one example of such a system, and that various variations can be employed, all within the scope of the present invention. For example, the electronic key device 152 can be located in the chassis 120, rather than in the module 110, in which case the electronic key signal unit 156 will be located in the module 110, rather than in the chassis 120. Likewise, the mechanical lock-out device 130 can be supported within the module 110, and the chassis 120 can be provided with an arresting surface. When extended, the securing pin 136 contacts the arresting surface on the chassis to prevent the module from being fully inserted into the chassis. When the securing pin is retracted the module can be fully inserted into the chassis.

Figure 6:
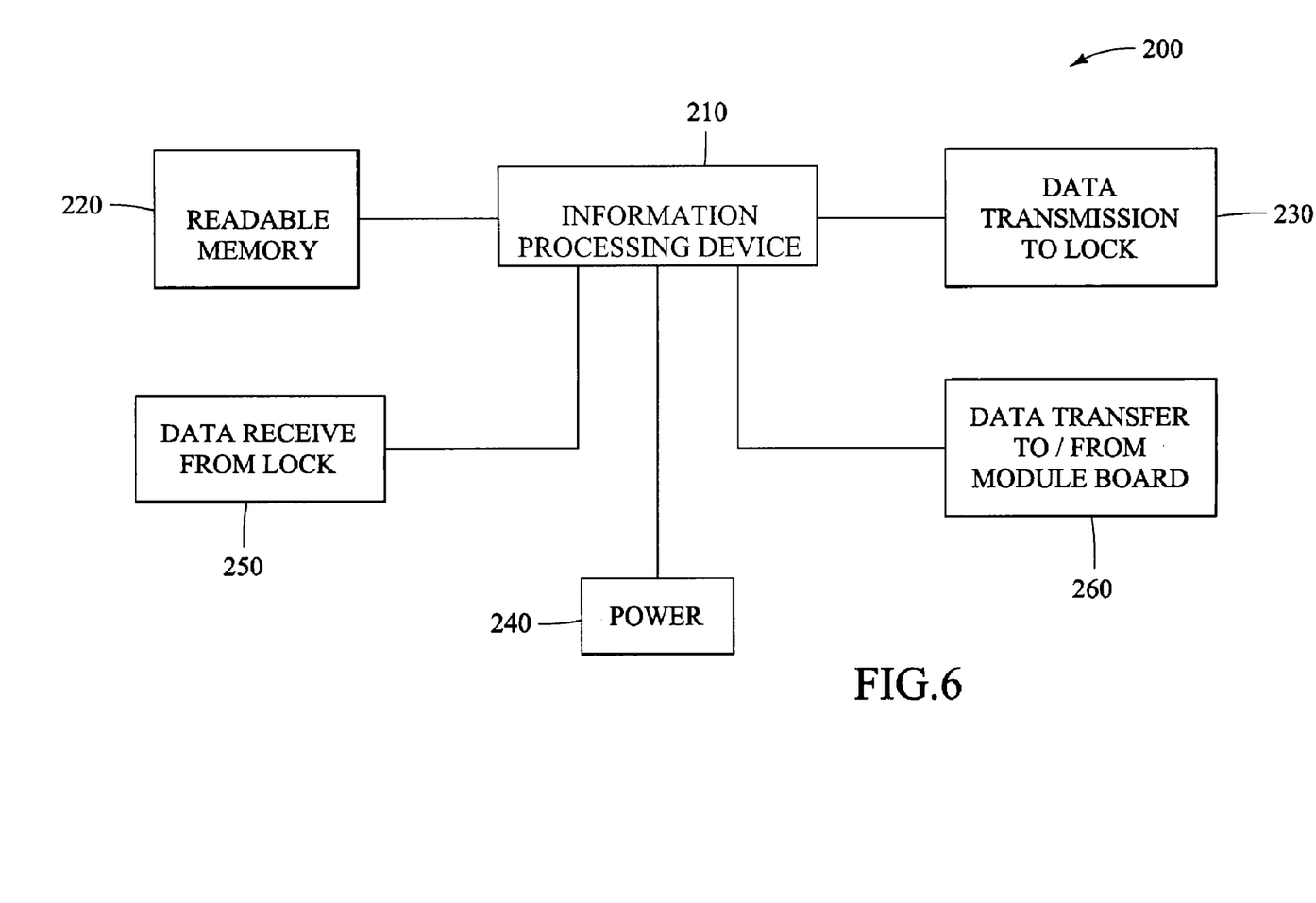
FIG. 6 is a schematic diagram showing components which can be present in the key portion of a module lock-and key system in accordance with the present invention.

Turning now to FIG. 6, a schematic diagram depicting the various operational components of a key device 200 in accordance with the present invention is shown. It is understood that the various components need not all be located in the same physical enclosure. For example, some operational components can be contained within the electronic key (item 152 in FIG. 2), while other operational components can be contained on the circuit board 114 within the module 110, or in a local controller in the array, or even in a main controller connected to the array (such as item "C" in FIG. 1). Further, not all of the operational components shown in FIG. 6 are necessary for operation of the key device.

Figure 7:
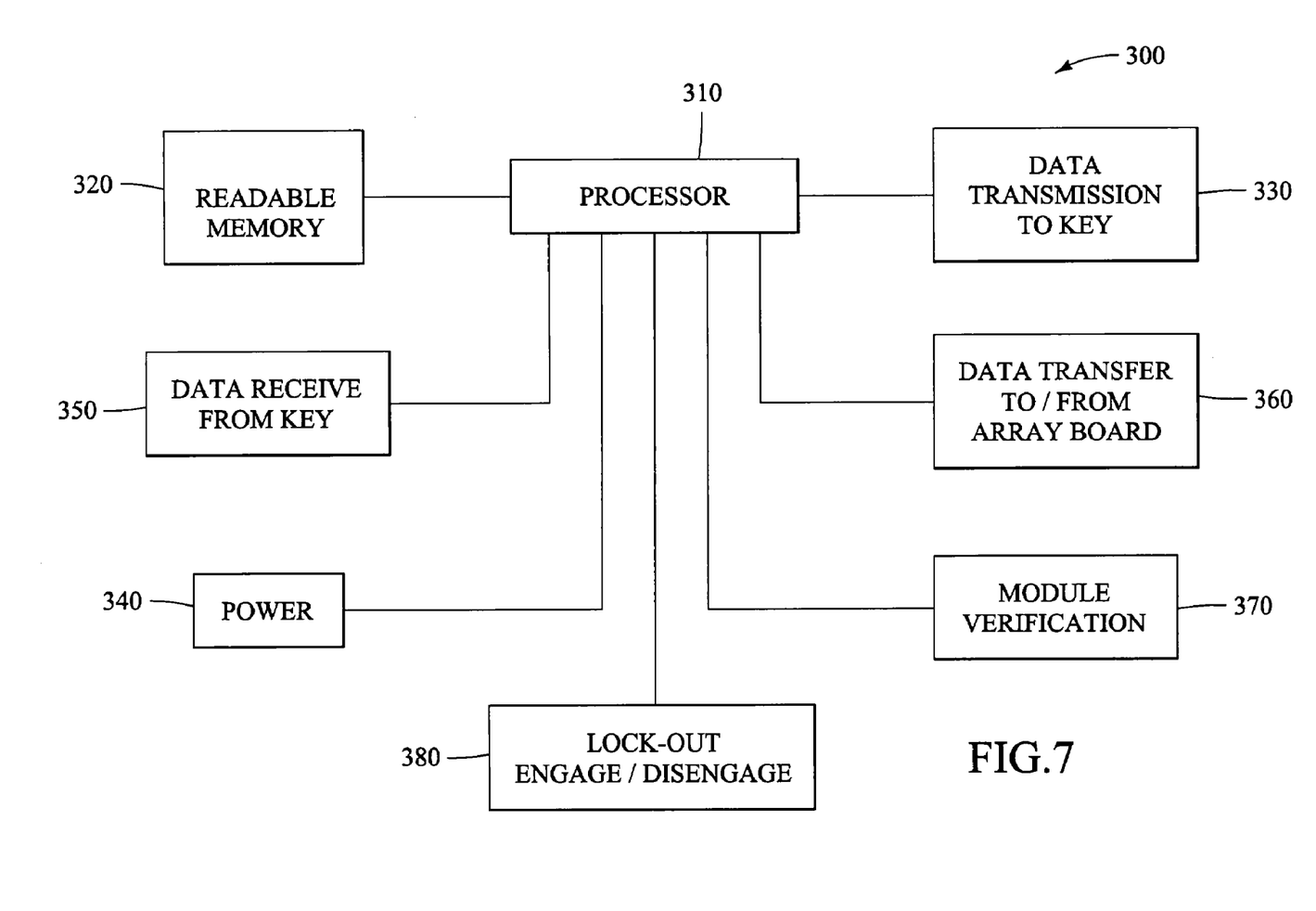
FIG. 7 is a schematic diagram showing components which can be present in the lock portion of a module lock-and key system in accordance with the present invention.

Turning briefly to FIG. 7, a schematic diagram depicting the various operational components of a lock device 300 in accordance with the present invention is shown. As with the key device 200 of FIG. 6, it is understood that the various components need not all be located in the same physical enclosure. For example, some operational components can be contained within the lock signal unit (item 156 in FIG. 2), while other operational components can be contained in a local controller in the array or in a main controller connected to the array (such as item "C" in FIG. 1). Also, not all of the operational components shown in FIG. 7 are necessary for operation of the lock device.

The key device 200 of FIG. 6 will now be discussed in conjunction with the lock device 300 of FIG. 7, since the two devices interact operationally in a "lock-and-key" fashion to allow the module to access the system, provided the module "key" fits the system "lock". With reference to FIG. 6, the key device 200, as depicted, can include an information processing device 210 which functions to coordinate the other operational components of the key device. The information processing device can be for example a state machine comprising a plurality of logic gates configured to perform a designated function or functions in response to a predefined set of conditions when the conditions are satisfied. The information processing device can also comprise a microprocessor configured to perform a series of computer executable program steps. In communication with the information processing device 210 is a readable memory 220 and a data transmission device 230 to transmit data from the key device to the lock device. The readable memory can be for example a computer readable memory such as a read-only-memory (ROM) or a programmable random access memory (RAM). The key device can also include a power source 240 which can be in communication with the information processing device and/or other components of the key device, such as the data transmission device 230. One example of a power supply is a direct current power supply, such as direct current from a battery or alternating current from a power supply. Other examples of a power supply include a photoelectric cell and an antenna configured to receive power from a wireless transmission, such as a radio frequency. The key device 200 can also include a data receiving device 250 to allow the key device to receive information from the lock device. The key device can further include a module communication device 260 to allow the lock device to send and/or receive data from the module.

Turning to FIG. 7, the lock device 300, as depicted, can include at least one processor 310 which functions to coordinate the other operational components of the lock device. The processor 310 can be an information processing device similar to the information processing device 230 of FIG. 6, or it can be a full computer processor. The processor functions can also reside within an information processing unit such as a local controller or a main controller, as will be described more fully below. In communication with the processor 310 is a readable memory 320 and a data receiving device 350. The data receiving device can allow the lock device to receive information from the key device. The readable memory can be a device similar to the readable memory 220 of FIG. 6, described above. The key device 300 can also include a power source 340, which can be configured in a manner similar to the power supply 240 depicted in FIG. 6 and described above. The power supply can be connected directly to the processor 220, and/or directly other components within the lock system. The lock device can also include an array communication device 360 to allow the lock device to send and/or receive data from a controller in communication with the array. The controller can either be a controller local within the array, or a main controller. Preferably, the lock device 300 is in communication with a local controller, which in turn is in communication with a main controller having overall management of the system. The lock device 300 can also include a data transmitting device 330 to allow the lock device to transmit data to the key device, and a lock-out device 380 similar to lock-out unit 160 of FIG. 2.

It is understood that the schematic diagrams of the lock device 200 of FIG. 6 and the key device 300 of FIG. 7 are exemplary only, and that other configurations can be employed, all within the scope of the present invention. In general, a lock-and-key apparatus in accordance with the present invention includes a key device capable of transmitting a distinct code to a receiver in a lock device. The lock device is then configured to determine whether or not to admit the component associated with the key device, based on the code. As indicated earlier, the positions of the lock device and the key device can be exchanged, such that the lock device is associated with the component and the key device is associated with the receiving system.

Figure 9:
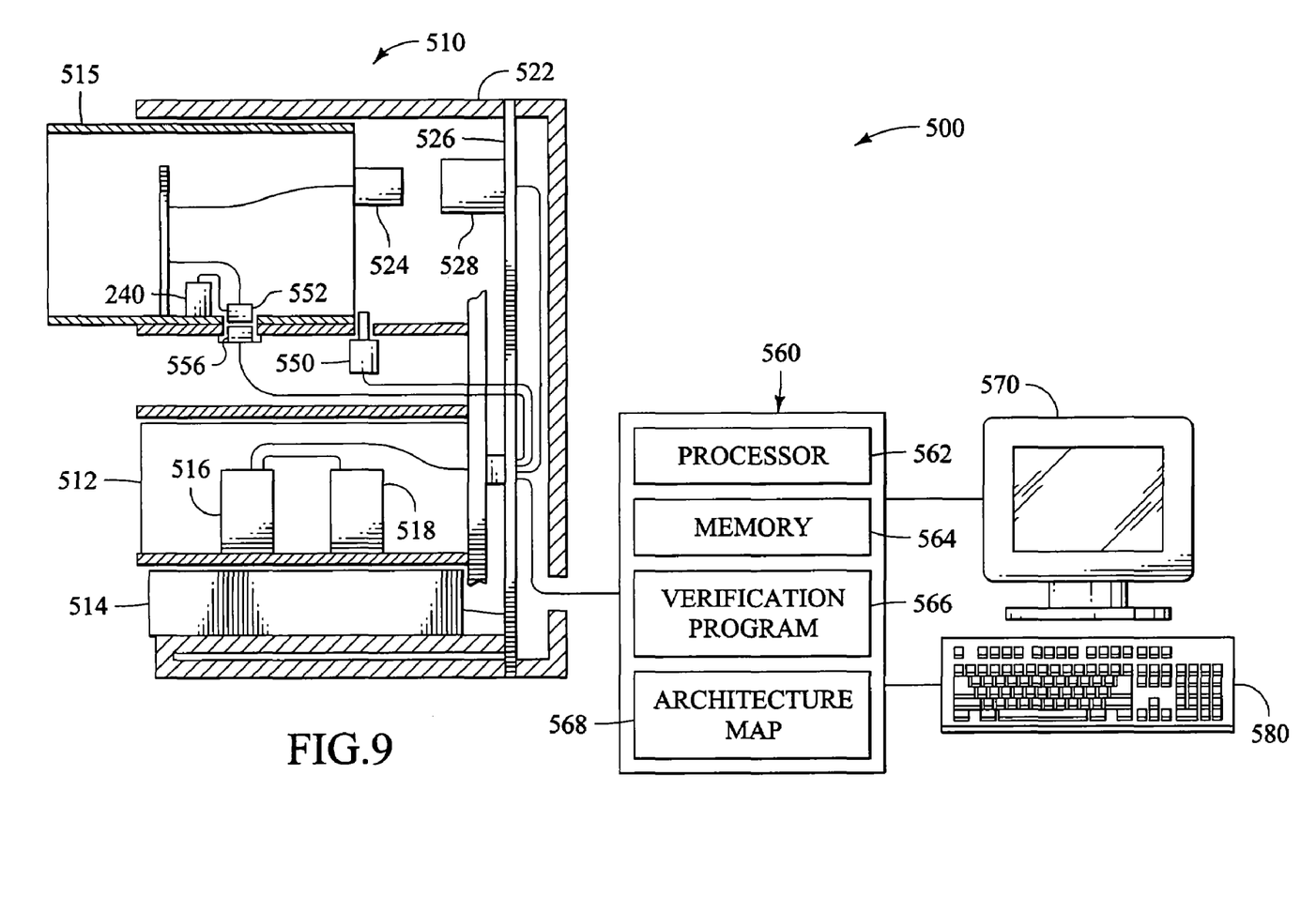
FIG. 9 is a schematic diagram of a computer system incorporating a component verification system in accordance with one embodiment of the present invention.

FIG. 9 depicts a schematic diagram of one example of a computer system 500 which incorporates a component verification system in accordance with one embodiment of the present invention. FIG. 9 is provided for illustrative purposes to show where the various components of the key and lock devices of FIGS. 6 and 7 can be located. The computer system 500 has a central controller 560, which is connected to an array 510. The array 510 can be one of many such arrays connected to the main controller 560. The main controller is provided with a user display 570, such as a video terminal, and a user input station 580, such as a keyboard. The main controller also includes an information processing unit, shown here as processor 562, a readable memory 564 such as a computer readable memory, and a verification program 566. The verification program, which will be describe more fully below, preferably comprises a set of computer executable steps which are stored in the computer readable memory 564 and are performed by the processor 562. The verification program can also comprise an arrangement of logic gates configured to perform the verification process, without use of the processor 562. For purposes of simplicity, in the following discussion it is assumed that the verification process is carried out by a set of computer executable instructions in the processor 562, although this is not a requirement.

The main controller can also include a system architecture map 568 which can be stored in the main controller's readable memory 564. The architecture map can include a listing of all of the modules currently in use within the system, as well as the corresponding slots in which the modules are inserted. The modules can be identified by module identification codes, each module preferably having a unique module identification code. Likewise, the slots in each array can be identified by slot identification codes, each slot preferably having a unique slot identification code. Alternately, the slots can be generally categorized by slot type to thereby allow greater flexibility within the array. The module identification codes can contain such information as the service or function performed by each module. The slot identification codes can include information regarding the assigned functions of the array slots. The architecture map can also include a history of the services a module has been and is currently performing, a listing of modules currently removed from the array for maintenance or repair, and a list of the modules that are performing back-up functions for removed modules. Other information can also be included in the system architecture map 568.

The array 510 of the computer system 500 is configured to receive a module 515 in an open slot in the array chassis 522. Only one such module 515 is shown, although typically the array 510 will have a plurality of such modules. As shown, the module 515 is basically the same as the module 110 of FIG. 2. The module 515 is depicted as being only partially inserted into the slot, and is in a position for the verification process to occur. The array has an electrical connector plane 526 which supports a plane connector 528. The plane connector 528 is configured to mate with the module connector 524. The array 510 is also provided with a mechanical lock-out device 550, similar to the lock-out device 160 describe above for FIG. 2. The lock-out device 550 prevents the module connector 524 from being connected to the plane connector 526 until the module is verified as acceptable by the verification system.

The array 510 of FIG. 9 further includes a power supply module 514, and a local controller module 512. The local controller 512 is in communication with the main controller 560, and can manage local control functions, such as routing of signals from the main controller to the modules within the array 510. The local controller has a processor 516 and a computer readable memory 518.

In the exemplary system depicted in FIG. 9, the key device comprises an electronic key 552, which is essentially the same as the electronic key 152 shown and described in FIG. 2. The electronic key 552 can include within the unit itself the following operational components of the key device depicted in FIG. 6: the information processing device 210, the readable memory 220, and the data transmitter 230 for sending a signal or signals to the lock device. A data receiver 250 and a module data transfer component 260 can also be included in the electronic key 552. In the example shown, the electronic key 552 is powered by a battery 240 which is resident within the module 515.

Unlike the components of the key device depicted in FIG. 9, the components of the exemplary lock device in FIG. 9 are found in several different locations. The lock device processor 310 (FIG. 7) can be either or both of the local controller processor 516 and the main controller processor 562. Likewise, the lock device readable memory can be both the local controller computer readable memory 518 and the main controller computer readable memory 564. The receiver to receive data from the key device (item 350 of FIG. 7) can be located in the lock signal unit 556, which is essentially similar to the lock signal unit shown and described above as item 156 in FIG. 2. Similarly, the components to transmit data to the array, and hence to the local controller processor 516 (see item 360 of FIG. 7) can be located in the lock signal unit 556. If the lock device is configured to transmit data to the key device as indicated by item 330 of FIG. 7, then the operational components for a transmitter to perform these functions can be contained within the lock signal unit 556. The module verification component, item 370 of FIG. 7, can be the module verification program 566 of FIG. 9 (described above), which is depicted as being located in the main controller 560. However, certain functional components of the verification program can also be located in the local controller 512.

Having shown and described apparatus in FIGS. 2–7 and 9 which can be used to implement a component verification system in accordance with the present invention, we will now describe how a component verification system can be used. The following description will make reference to the various devices shown in the drawings, and is understood to merely constitute examples of how a component verification system can be used. Other methods of use within the scope of the present invention can also be employed.

In one example, a computer system 500 of FIG. 9 has a plurality of arrays, of which array 510 is but one. A module 515, which can be inserted into an open slot in the array 510, is provided with an electronic key 552. The electronic key contains an identification code which can be stored in the readable memory 220 of FIG. 6. The identification code can uniquely identify the module within overall computer system. Let us assume that the module 515 has been previously removed for service, and is now to be reinstalled in the computer system. A user first inserts the module 515 into an open slot in the array 510. If a mechanical lock-out device 550 is used, the module can only be partially inserted into the open slot, such that the connectors 524 and 528 do not mate. The operator can then signal to the computer system via the user input device 580 that a module is present for verification. This last step can be eliminated where the array 510 is configured to automatically detect the presence of a module and initiate the verification sequence without user input. For this variation, the lock signal unit 556 can be provided with a sensor (not shown) which can alert the local controller 512 to the presence of the module in the slot. In any event, the module verification sequence is then begun.

A first step in the verification sequence can be for the lock signal unit 556 to send a signal to the electronic 552 key to poll the key regarding the identity of the module 515. In response to receiving the polling signal from the lock signal unit, the electronic key can transmit the module identification code to the lock signal unit, which then communicates the communication code to the local controller 512, along with a code identifying the slot in which the module has been inserted. The local controller then communicates the module and slot identification codes to the main controller 560. The main controller can then access the system architecture map 568 and, using the module and slot identification codes and the verification program 566, determine if the module should be accepted within the slot and connected to the array. If the module should fail to be verified for the slot (for example, if the module has been previously assigned to another slot), then the controller 560 can signal a user via the user display 570 that the module 510 has been inserted into the wrong slot. If the module has a previously assigned slot, the controller can also provide this information to the user. Likewise, if the slot in question has a previously assigned module, the controller can provide this information to the user. When a module fails to be verified, the main controller 560 can notify the local controller 512 so that the local controller does not take any actions to put the module into service.

If the main controller 560 verifies that the module should be accepted into the slot in the array, then the main controller can send an authorization signal to the local controller 512. The local controller can then send a signal to the lock-out device 550 directing the lock-out device to disengage such that the module can be fully inserted into the slot. After the lock-out device has been successfully disengaged, the local controller 512 can signal the main controller 560 that the module can now be connected to the array 510. The main controller can then notify a user via the user display 570 that the module has been verified and can now be fully inserted into the array. The user can then push the module into the array to allow the connectors 524 and 528 to mate. In one variation, after the lock-out device has been disengaged, the local controller 512 can illuminate a light, such as LED 115' of FIG. 2, that the module has been accepted. This allows a user to see whether or not a module has been verified without having to go to the user display 570 (FIG. 9), which can be remote from the array 510. In another variation, after the lock-out device has been disengaged, the local controller 512 can send a signal to the lock signal unit 556 rather than to the main controller. The lock signal unit can then transmit a signal to the electronic key 552 indicating that the module has been accepted, and the electronic key can cause the LED 115 (FIG. 2) on the module to illuminate, indicating to a user that the module has been verified as acceptable.

In one variation on the above configuration, if a mechanical lock-out device 550 is not employed, then the module 515 can be fully inserted into the slot in the array 510, and the connectors 524 and 528 can mate. However, the local controller can be configured with an electronic lock-out program to not allow the module to be used until the main controller has provided an authorization code. The authorization code can then be obtained in the manner described above by polling the electronic key for a module identification code. The module identification code can then be used by the verification program 566. If the verification program determines that the module 515 is accepted for use, the module can then be placed into service by the local controller 512. This variation has at least two advantages. One advantage is that the local controller can be configured to allow the power supply module 514 to provide electrical power to the module, and thus the electronic key 552, before the module has been accepted for service within the system. The module then does not need to have a separate power supply 240 to power the electronic key. A second advantage is that an operator does not need to fully insert the module 515 into the array 510 after the main controller 560 verifies that the module is acceptable for the slot in the array.

After the module 515 has been physically connected to the array 510, and before the module is placed into operational service, the local controller 512 can perform a diagnostic routine on the module to determine whether the module is operating properly. If the module is functioning as it should, then the local controller can signal the main controller 560 that the module is ready for use, and the main controller can place the module 515 into service. However, if the local controller determines that the module is not operating correctly, it can notify the main controller, which can then notify a user via the user display 570, and the module is not placed into service.

In another variation, the controller (local controller 512 or main controller 560) can be configured to store data in the readable memory in the electronic key 552. In this way, if the controller detects a problem with the module which requires the module to be removed for maintenance or repair, the controller can store information in the electronic key describing the problem with the module. Once the module is removed for servicing, a technician can access the electronic key's readable memory and can determine what repairs or servicing should be performed. Since the electronic key can also uniquely identify the module, these features allow a module to be sent to a shop for servicing with little or no accompanying paperwork. This in turn saves operator time, and reduces the opportunity for human error (e.g., misdescription of the module defects, lost paperwork, etc.).

In addition to allowing a controller to access the electronic key's readable memory and save pertinent data therein, the electronic key readable memory can also be configured to be accessible by a repair technician. Thus, not only can a technician read the memory and determine what needs to be done to repair the module, but after the repairs have been affected the technician can record the repairs made, the date, and other information in the electronic key's memory. Thereafter, when the module is returned to be reinstalled in the array, the main controller can read the electronic key's readable memory to determine if repairs have been made. This is useful since it helps to reduce the chance that a module removed for servicing will accidentally be reinstalled into the array before repairs have been made.

Another use of the verification system of the present invention occurs when modules are removed from an array for reasons other than maintenance. For example, if a computer memory system is being expanded, it can be necessary to remove the modules from an array enclosure when the enclosure is moved or additional module slots are added to the array. In this instance it is desirable to retain the memory contents of each module in the array, and also to ensure that the modules are returned to their original slots. The verification system is basically used in the manner described above to allow the main controller to verify that a module is correctly positioned, and to authorize use of the module before it is placed into service. Alternately, if the modules are not returned to their original slots, the electronic key uniquely identifying each module can be used to allow the controller to identify the modules and the slots in which they are disposed. This information can then be used to update the architecture map (568 of FIG. 9), and the modules can be used where positioned.

Figure 8A:
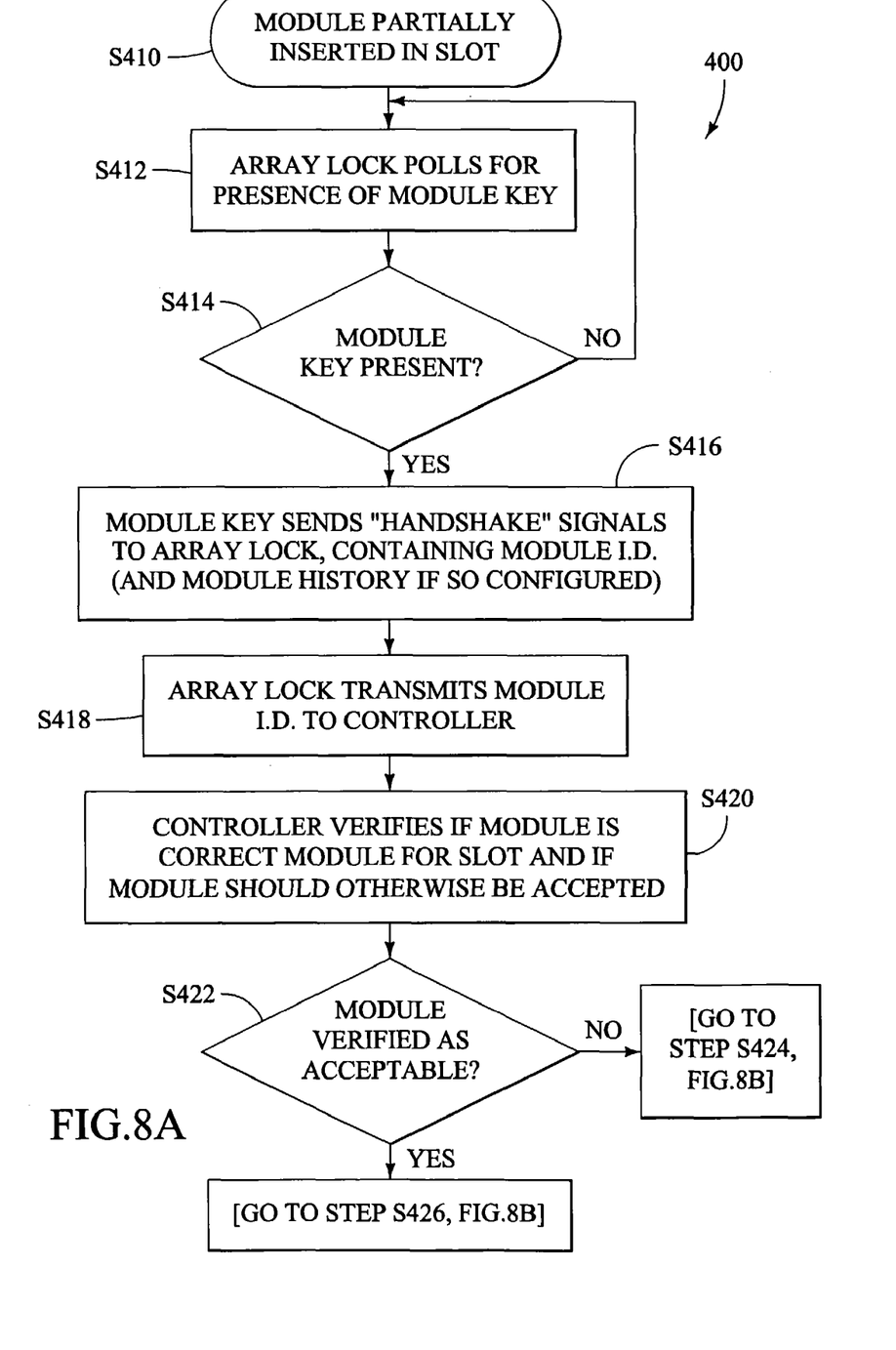
FIGS. 8A and 8B together depict a flow chart showing one process for using a module lock-and key system in accordance with the present invention.
Figure 8B:
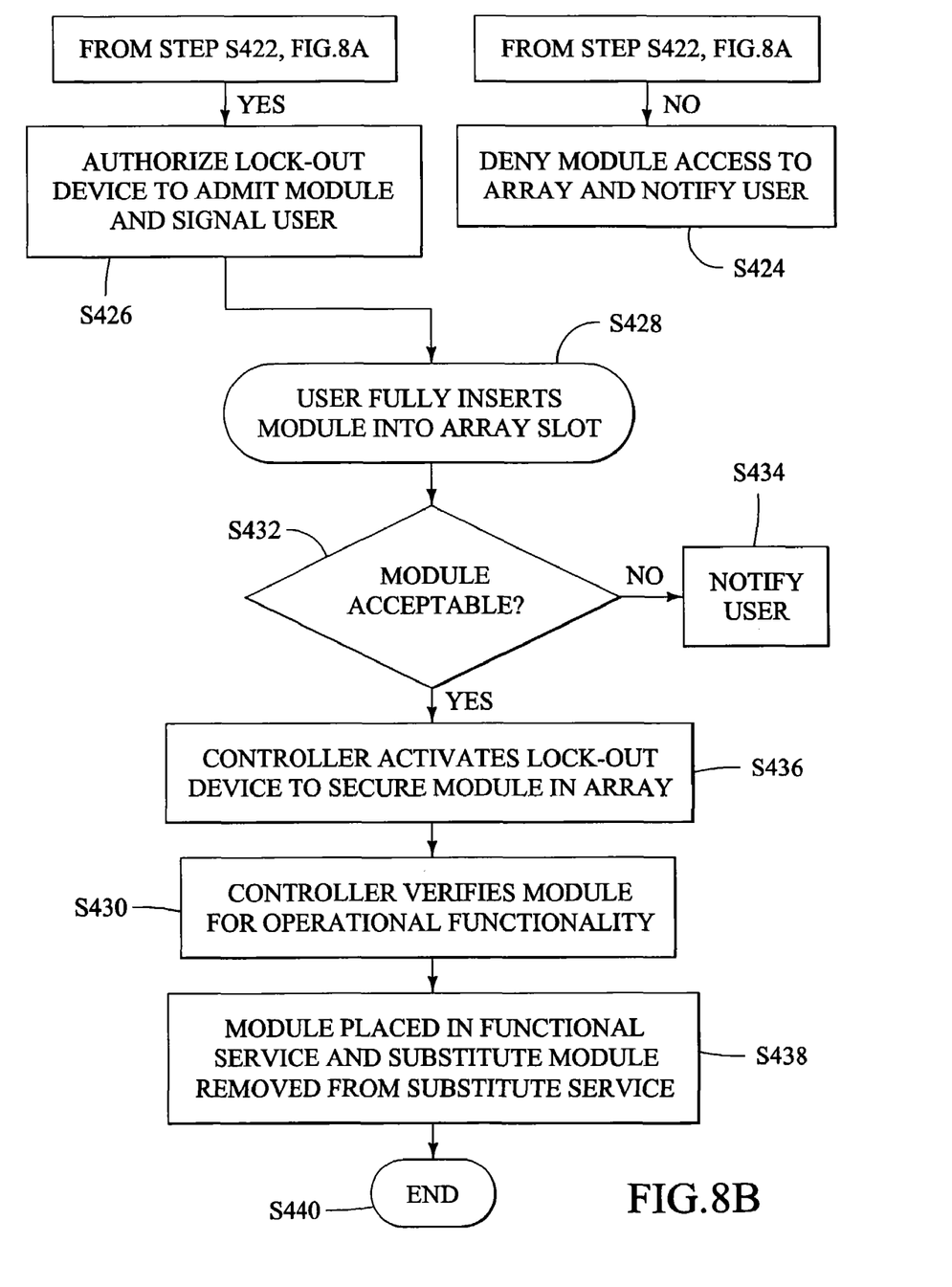

Turning now to FIGS. 8A and 8B, a flow chart 400 is depicted which shows how one method in accordance with the present invention can be practiced. The method provided for in the flow chart 400 is essentially one variation of the method described above, and therefore the following description should be read in light of the foregoing disclosure. It is understood that the flow chart 400 depicts but one embodiment of the present invention, and should not be considered as limiting the scope of the invention.

With reference to FIG. 8A, the process beings when an operator partially inserts a component into a receiving system at step S410. For example, the module 110 of FIG. 2 is partially inserted into a slot in the array 120. This assumes that an a mechanical lock-out device, such as lock-out device 160 of FIG. 2 is used. At step S412 a lock device in the slot in the array checks for the presence of a component key. The verification system can be configured such that the lock device continually senses the slot for a key device until one is found. If no key device, the process returns to step S412 to continue sensing for a key device. However, if the lock system detects a component key, then at step S416 the lock device "handshakes" with the key device. That is, the lock device signals to the key device to transmit component identification information to the lock device, and the key device in turn transmits the requested information. The key device can also transmit other information to the lock device at this time, such as the recent history of the module in which the key is installed.

Having received the component identification information from the key device in step S416, the lock device then transmits this information to a controller at step S420. At step S420, the controller performs a verification routine to determine if the module inserted in to the slot is the correct module for that slot, and if the module should otherwise be accepted (e.g., it can determine if necessary repairs to the module have been made, in the manner described above). Based on the results of the verification routine, at step S422 the controller makes a decision to accept or not accept the module. If the module is not accepted, control moves to step S424 (FIG. 8B), the module is not allowed to be placed into service in the array, and a user is notified. However, if at step S422 the controller determines that the module is acceptable, then at step S426 (FIG. 8B) the controller authorizes the lock-out device to admit the module. The controller then signals a user that the module can be fully inserted and connected to the array.

After the user connects the module to the array at step S428, then at step S430 the controller can test the module for operational functionality by performing a diagnostic routine on the module. The results of the diagnostic routine are analyzed at step S432. If the diagnostic routine indicates that the module should not be used for some operational reason, then at step S434 the controller notifies a user, and the module is not placed into service. It should be mentioned here that the rejection of the module for use at step S434 is not based on the module being inserted into the wrong slot, but rather that the module is not performing correctly for its intended function. If the diagnostic routine indicates that the module is acceptable for use for its intended function, then at step S436 the controller can activate the mechanical lock-out device to lock the module into the array to guard against accidental removal. Finally, at step S438 the module is placed into operational service, performing its intended function within the system. At this time, any module which was being used as a substitute for the newly inserted module can be taken out of the substitute service and put into other service. The verification process then ends at step S440.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An interchangeable component intended to be received within a receiving system which has an electronic lock device configured to verify whether the interchangeable component should be received into the receiving system, the interchangeable component comprising:

an electronic key device within the interchangeable component and configured to uniquely identify the interchangeable component to the receiving system, the electronic key device comprising a readable memory containing an identification code and a signal transmitter configured to read the identification code from the readable memory and transmit the identification code as an identification signal to the receiving system.

2. The interchangeable component of claim 1, and further comprising a power source in communication with the signal transmitter.

3. The interchangeable component of claim 1, and further comprising a data input port configured to allow data to be stored in and read from the readable memory.

4. The interchangeable component of claim 3, and wherein the readable memory contains at least a partial history of the component.

5. The interchangeable component of claim 1, and further comprising an information processing device in communication with the readable memory and the signal transmitter.

6. The interchangeable component of claim 1, and further comprising a signal receiver configured to receive a signal from an electronic lock device.

7. An interchangeable component configured to be mated with a receiving system, comprising:
   a key device supported by the interchangeable component, the key device comprising a transmitter configured to transmit a signal comprising component identification codes, and a readable memory configured to store the identification codes.

8. The interchangeable component of claim 7, and further comprising a power source in communication with the transmitter.

9. The interchangeable component of claim 7, and further comprising a data input port configured to allow data to be stored in and read from the readable memory.

10. The interchangeable component of claim 9, and wherein the readable memory contains at least a partial history of the component.

11. The interchangeable component of claim 7, and further comprising an information processing device in communication with the readable memory and the signal transmitter.

12. The interchangeable component of claim 11, and wherein the information processing unit is configured to save in the readable memory data pertaining to the operation of the component within the receiving system.

13. The interchangeable component of claim 7, and further comprising a signal receiver configured to receive a signal from an electronic lock device.

14. An electronic key device for use in a component intended to be received within a system which has an electronic lock device configured to respond to the electronic key device, the electronic key device comprising:
   a readable memory containing an identification code; and
   a signal transmitter configured to read the identification code from the readable memory and transmit the identification code as an identification signal;
   a data input port configured to allow data to be stored in and read from the readable memory; and
   wherein the readable memory contains at least a partial history of the component.

* * * * *